UNITED STATES PATENT OFFICE.

JOHN R. MARSTON, OF CLARKDALE, ARIZONA.

MANUFACTURE OF CADMIUM PIGMENT.

1,399,506.   Specification of Letters Patent.   Patented Dec. 6, 1921.

No Drawing.   Application filed August 15, 1921. Serial No. 492,472.

*To all whom it may concern:*

Be it known that I, JOHN R. MARSTON, a citizen of the United States, residing at Clarkdale, in the county of Yavapai and State of Arizona, have invented certain new and useful Improvements in the Manufacture of Cadmium Pigment, of which the following is a specification.

My invention has relation to improvements in the manufacture of cadmium pigment, and consists in the novel features more fully set forth in the specification and pointed out in the claims.

The object of the present invention is to utilize the zinc dust precipitates that are obtained by treating zinc sulfate solutions with metallic zinc, as set forth in the application of John R. Marston on process of purifying zinc sulfate solutions, co-pending herewith. The zinc dust precipitate contains finely divided metallic zinc, metallic copper, cadmium and arsenic.

The first step in the process is to eliminate the copper, which is insoluble in dilute sulfuric acid (except at high temperature). In view of the fact that copper oxidizes very easily by contact with air to copper oxid, which is soluble in dilute sulfuric acid, it is necessary to treat the zinc dust precipitate at once after filtration of the zinc sulfate solution or keep it covered with water.

The zinc dust precipitate is placed in a suitable tank or vessel and dilute sulfuric acid (5% to 10%) added. The sulfuric acid, of course, immediately attacks the zinc, and after any violent reaction has taken place the mixture is heated moderately with steam. The temperature to which the mixture is heated should be high enough to cause the cadmium and zinc to dissolve, but not the copper. Should the zinc dust precipitate contain any lead, that will not be acted on by the dilute sulfuric acid, but will remain in the residue. The reactions brought about by the sulfuric acid are as follows:

$$Zn + H_2SO_4 = ZnSO_4 + 2H$$
$$Cd + H_2SO_4 = CdSO_4 + 2H$$
$$Cu + H_2SO_4 = \text{no reaction.}$$
$$As + H_2SO_4 = \text{very small amount of arsenic may go into solution. Some evolved as } AsH_3 \text{ gas.}$$

The zinc and cadmium will therefore be readily dissolved. After the reactions are completed and all the cadmium and zinc in solution, the solution is filtered, leaving a residue of metallic copper and arsenic. In addition to zinc sulfate and cadmium sulfate the solution may contain a small amount of arsenic (probably as arsenious acid) and an excess of sulfuric acid.

The solution is now heated in a suitable vessel with a metallic sulfid, such as barium sulfid solution and the following reactions brought about:

$$ZnSO_4 + BaS = ZnS + BaSO_4$$
$$CdSO_4 + BaS = CdS + BaSO_4$$

The zinc sulfid precipitated may have the formula $3ZnS \cdot 2H_2O$ or $2ZnS \cdot H_2O$ while the cadmium sulfid may be contaminated with $Cd_2SO_4S$. If any arsenic is present it will be precipitated as $As_2S_3$. The resulting precipitate is then washed, dried, and ground to produce a paint pigment with a deep yellow to orange color.

When lithopone is used as the precipitating agent instead of barium sulfid the reactions are as follows:

$$H_2SO_4 + BaSO_4 \cdot ZnS + ZnSO_4 = H_2S + ZnSO_4 + BaSO_4$$
$$H_2SO_4 + BaSO_4 \cdot ZnS + CdSO_4 = CdS + ZnSO_4 + BaSO_4$$

The ZnS reacts with the $H_2SO_4$ to produce $H_2S$, and the $H_2S$ reacts with the $CdSO_4$ to produce CdS and $H_2SO_4$. The $ZnSO_4$ formed from the ZnS remains in solution and the $BaSO_4$ is unchanged. If zinc sulfid is used alone as the precipitating agent the reaction would be the same except that the $BaSO_4$ is not present.

The resulting pigment containing $BaSO_4 \cdot CdS \cdot ZnS$ and a small amount of $As_2S_3$ is virtually the same as lithopone in covering power, but colored yellow from the CdS.

Having described my invention, I claim:

1. The process of manufacturing cadmium pigment from zinc dust precipitates which consists in treating the precipitates with dilute sulfuric acid to dissolve the zinc, heating the mixture to dissolve the cadmium in the precipitate, drawing off the solution containing cadmium sulfate and zinc sulfate, and thereafter treating the same with a sulfid to precipitate the zinc and cadmium as sulfids.

2. The process of manufacturing cadmium pigment from zinc dust precipitates containing metallic copper and cadmium, which consists in treating the precipitate with dilute sulfuric acid to dissolve the zinc, raising the temperature of the mixture sufficiently to dissolve the cadmium but not the copper, drawing off the solution containing zinc sulfate and cadmium sulfate and treating the same with a sulfid to precipitate the zinc and cadmium as sulfids.

3. In the manufacture of cadmium pigment, the process which consists in treating zinc dust precipitates containing metallic copper and cadmium with dilute sulfuric acid to dissolve the zinc as zinc sulfate, thereafter heating the mixture to a temperature to effect a solution of the cadmium as cadmium sulfate, drawing off the solution and thereafter treating the same with barium sulfid to precipitate the zinc and cadium as sulfids and produce a paint pigment.

4. In the manufacture of cadmium pigment, the process which consists in placing in a treatment tank zinc dust precipitates containing metallic copper, cadmium, and arsenic, treating the precipitate with dilute sulfuric acid to dissolve the zinc as zinc sulfate, thereafter raising the temperature of the mixture sufficiently to dissolve the cadmium but not the copper, filtering the solution into a second treatment tank and treating the same with barium sulfid to precipitate the zinc and cadium as sulfids together with barium sulfate, and finally washing, drying and grinding the precipitate to produce a paint pigment.

5. In the manufacture of cadmium pigment, the process which consists in treating zinc dust precipitate containing metallic copper and cadmium with dilute sulfuric acid to dissolve the zinc and cadmium as sulfates, the mixture being heated with steam to a temperature below that at which the copper dissolves, drawing off the solution and thereafter treating the same with barium sulfid for precipitating the zinc and cadmium as sulfids, and finally drying and grinding the precipitate to produce a cadmium paint pigment.

In testimony whereof I hereunto affix my signature.

JOHN R. MARSTON.